United States Patent [19]

Ura et al.

[11] Patent Number: 4,657,821
[45] Date of Patent: Apr. 14, 1987

[54] PAPER COATING COMPOSITION

[75] Inventors: Shigeru Ura, Nara; Mikio Iwata; Haruo Tanaka, both of Osaka; Hiroyuki Shiono, Chiba, all of Japan

[73] Assignee: Sumitomo Chemical Co., Ltd., Osaka, Japan

[21] Appl. No.: 807,558

[22] Filed: Dec. 11, 1985

[51] Int. Cl.$^4$ .................. C08F 218/04; D21H 1/28
[52] U.S. Cl. .................. 428/510; 427/391; 428/514; 428/537.5; 524/561; 526/318.3; 526/318.44
[58] Field of Search .................. 526/317; 524/561; 428/514, 510, 537.5; 427/391

[56] References Cited

U.S. PATENT DOCUMENTS

| | | | |
|---|---|---|---|
| 4,112,155 | 9/1978 | Carel et al. | 8/555 |
| 4,185,050 | 1/1980 | Lazear et al. | 428/514 |
| 4,265,977 | 5/1981 | Kawamura et al. | 428/514 |
| 4,314,035 | 2/1982 | Hobes et al. | 525/62 |
| 4,322,516 | 3/1982 | Wiest et al. | 526/304 |
| 4,423,118 | 12/1983 | Corbett et al. | 427/391 |
| 4,446,311 | 5/1984 | Hobes et al. | 528/492 |
| 4,503,185 | 3/1985 | Hausman et al. | 524/553 |
| 4,610,920 | 9/1986 | Mudge et al. | 427/391 |

FOREIGN PATENT DOCUMENTS 0110235  8/1979  Japan .................. 428/514

OTHER PUBLICATIONS

Derwent Abstract 85-028418/05 (J59223396), Dec. 14, 1984, Sumitomo Chem. K.K. 83JP-096439.
Derwent Abstract 85-028419/05 (J59223397), 12-1-4-84, Sumitomo Chem. K.K.

*Primary Examiner*—Herbert J. Lilling
*Attorney, Agent, or Firm*—Sughrue, Mion, Zinn Macpeak & Seas

[57] ABSTRACT

A paper coating composition is disclosed, which comprises:
(A) a pigment, and
(B) a copolymer emulsion prepared by polymerizing a monomer mixture containing:
(i) 5 to 40 wt % of an α-olefin of the formula:

$$CH_2=CH-R_1$$

wherein $R_1$ is a hydrogen atom or an alkyl group having 1 to 12 carbon atoms;
(ii) 30 to 90 wt % of a vinyl ester of the formula:

$$CH_2=CH-OCO-\underset{R_4}{\overset{R_2}{\underset{|}{\overset{|}{C}}}}-R_3$$

wherein $R_2$, $R_3$ and $R_4$ are each a hydrogen atom or an alkyl group having 1 to 18 carbon atoms;
(iii) 1 to 30 wt % of at least one unsaturated carboxylic acid ester selected from the group consisting of an acrylic acid ester in which the alkyl moiety thereof has 1 to 18 carbon atoms and a methyacrylic acid or dibasic unsaturated carboxylic acid ester in which the alkyl moiety thereof has 1 to 18 carbon atoms; and
(iv) 0.1 to 10 wt % of an unsaturated carboxylic acid. The paper coating composition of the invention provides improved printability and printing quality and is particularly useful for gravure printing.

13 Claims, No Drawings

PAPER COATING COMPOSITION

FIELD OF THE INVENTION

The present invention relates to a paper coating composition providing improved printability and printing quality. More particularly, the present invention relates to a composition providing a coated paper for gravure printing that will ensure faithful reproduction of dots, excellent gloss and dry picking resistance and which undergoes minimum time-dependent deterioration in terms of these desirable characteristics.

BACKGROUND OF THE INVENTION

The feature that distinguishes gravure printing from other printing methods is its ability to produce pictures with range of tones by varying the thickness of ink which is achieved by means of varying the depth of ink cells on the printing surface of the plate. Because of this characteristic, the gravure-printed matter exhibits ample gradations of sharp definition and offers wide ranges of colors, contrasts and tones.

In order to make the most of these advantages of gravure printing, the paper substrate to be gravure-printed must allow for high fidelity of dot reproduction. However, in the highlights of gravure print, dots often fail to be formed by ink transfer and the resulting print does not have the intended quality. This problem is particularly serious with coated paper which inherently has excellent printing quality. Improvements of dot reproduction on coated paper for gravure printing are of primary concern to the paper industry because the commercial value of the coated paper is largely dependent on its ability to faithfully reproduce dots.

Styrene-butadiene latices have been extensively used as pigment binders in coated paper for gravure printing, but they are not completely satisfactory for the purpose of faithful dot reproduction and their ability in this respect is further decreased if they are used in combination with water-soluble polymers such as starch commonly used as thickeners or water retention aids. Another serious problem that has been encountered in using styrene-butadiene latices as pigment binders is that even if coated paper as manufactured has a dot reproducing ability that is satisfactory for practical purposes, this ability will be considerably deteriorated with a lapse of time.

Acrylic ester-based emulsions are known as pigment binders that ensure faithful dot reproduction and will not undergo any substantial deterioration with a lapse of time. However, coated paper using such emulsions has a low surface strength (i.e., low dry picking resistance) and is apt to foul the surfaces of supercalendering rolls.

As a result of various studies made in order to eliminate these problems with the conventional pigment binders, the present inventors found that by using a pigment binder made of a copolymer with a specified composition, a coated paper suitable for gravure printing can be provided that ensures faithful dot reproduction without undergoing any time-dependent deterioration, which exhibits a superior dry picking resistance, and which will not foul the surfaces of rolls used in supercalendering. The present invention has been accomplished on the basis of this finding.

SUMMARY OF THE INVENTION

The paper coating composition of the present invention comprises:
(A) a pigment, and
(B) a copolymer emulsion prepared by polymerizing a monomer mixture containing:
(i) 5 to 40 wt% of an α-olefin of the formula:

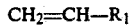

wherein $R_1$ is a hydrogen atom or an alkyl group having 1 to 12 carbon atoms;
(ii) 30 to 90 wt% of a vinyl ester of the formula:

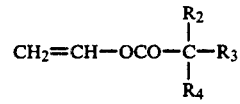

wherein $R_2$, $R_3$ and $R_4$ are each a hydrogen atom or an alkyl group having 1 to 18 carbon atoms;
(iii) 1 to 30 wt% of at least one unsaturated carboxylic acid ester selected from the group consisting of an acrylic acid ester in which the alkyl moiety thereof has 1 to 18 carbon atoms and a methacrylic acid or dibasic unsaturated carboxylic acid ester in which the alkyl moiety thereof has 1 to 18 carbon atoms; and
(iv) 0.1 to 10 wt% of an unsaturated carboxylic acid.

DETAILED DESCRIPTION OF THE INVENTION

Examples of the α-olefin used as the component (i) in the present invention include ethylene, propylene, butene-1, hexene-1, and dodecene-1, with ethylene being particularly preferred.

Examples of the vinyl ester used as the component (ii) in the present invention include vinyl acetate, vinyl propionate, vinyl butyrate, vinyl pivalate, vinyl laurate and vinyl versatate, with vinyl acetate or mixtures thereof with other vinyl esters being particularly preferred.

The unsaturated carboxylic acid ester used as the component (iii) in the present invention is selected from the group consisting of acrylic acid esters in which the alkyl moiety thereof has 1 to 18 carbon atoms and methacrylic acid or dibasic unsaturated carboxylic acid esters in which the alkyl moiety thereof has 1 to 18 carbon atoms. Illustrative examples include methyl acrylate, ethyl acrylate, butyl acrylate, amyl acrylate, hexyl acrylate, heptyl acrylate, octyl acrylate, 2-ethylhexyl acrylate, decyl acrylate, lauryl acrylate and stearyl acrylate; methyl methacrylate, butyl methacrylate, amyl methacrylate, hexyl methacrylate, 2-ethylhexyl methacrylate, dodecyl methacrylate, lauryl methacrylate and stearyl methacrylate; and dibutyl and bis(2-ethylhexyl)dilauryl esters of fumaric acid, maleic acid and itaconic acid. These compounds may be used as mixtures. Particularly preferred unsaturated carboxylic acid esters are those in which the alkyl moiety thereof has 5 to 14 carbon atoms and mixtures thereof with one or more of the above-described unsaturated carboxylic acid esters.

Examples of the unsaturated carboxylic acid used as the component (iv) include acrylic acid, methacrylic acid, itaconic acid, maleic acid, and fumaric acid, as well as monoesters of polybasic unsaturated carboxylic acids such as itaconic acid, maleic acid and fumaric acid. Particularly preferred compounds are acrylic acid and methacrylic acid.

The proportions of the monomer components (i) through (iv) are critical to the purpose of the present invention. They are 5 to 40 wt% for the α-olefin (i), 30 to 90 wt% for the vinyl ester (ii), 1 to 30 wt% for the unsaturated carboxylic acid ester (iii), and 0.1 to 10 wt% for the unsaturated carboxylic acid (iv). Preferred ranges are 10 to 30 wt% for (i), 50 to 85 wt% for (ii), 2 to 20 wt% for (iii) and 0.5 to 5 wt% for (iv).

If the content of the α-olefin (i) is less than 5 wt%, the desired dot reproduction is not ensured, and if its content exceeds 40 wt%, great difficulty will be involved in manufacturing the intended copolymer on a commercial scale, and in addition, the adhesion to the substrate will decrease to cause a reduced dry picking resistance or increase the chance of fouling the surfaces of rolls used in supercalendering.

If the content of the vinyl ester (ii) is less than 30 wt%, the adhesion to the substrate will decrease to cause a reduced dry picking resistance or increase the chance of fouling the surfaces of supercalendering rolls. If its content exceeds 90 wt%, the chance that inadequate dot reproduction will occur is increased.

If the content of the unsaturated carboxylic acid ester (iii) is less than 1 wt%, the desired dot reproduction is not ensured, and if its content exceeds 30 wt%, the frequency of the surfaces of supercalendering rolls being fouled will increase and the resulting print will often have a low gloss.

The content of the unsaturated carboxylic acid (iv) is particularly important for attaining the purpose of the present invention. Only when it is present in an amount of 0.1 to 10 wt% are ensured an improved adhesion to the substrate and significant improvements in dry picking resistance and dot reproduction. If the content of the component (iv) is less than 0.1 wt%, the improvement it provides is negligible, and if its content exceeds 10 wt%, the flowability of the coating composition is decreased to an undesirably low level.

The copolymer emulsion used in the present invention preferably has a glass transition point of 0° C. or below and more preferably −10° C. or below.

The copolymer emulsion used in the present invention may be prepared by copolymerizing the individual monomer components, i.e., the α-olefin, the vinyl ester, the unsaturated carboxylic acid ester, and the unsaturated carboxylic acid in an aqueous dispersion medium in the presence of a radical polymerization initiator, a pH modifying agent, an emulsifier and/or a dispersant such as protective colloid, and optionally a chain transfer agent.

The pigment (A) which is the other essential component of the composition of the present invention is selected from inorganic pigments such as kaolin, clay, talc, calcium carbonate, satin white, aluminum hydroxide and titanium oxide and organic synthetic pigments such as polystyrene, a melamine-formaldehyde resin and a urea-formaldehyde resin. These pigments may be used either singly or in combination.

In addition to the two essential components, i.e., the pigment (A) and the copolymer emulsion (B) which is comprised of the α-olefin, the vinyl ester, the unsaturated carboxylic acid ester, and the unsaturated carboxylic acid, the paper coating composition of the present invention may contain additives in amounts that will not be detrimental to the purpose of the invention. Illustrative additives include pigment binders such as a styrene-butadiene latex, an acrylic acid ester-based emulsion, starch, modified starch, casein and polyvinyl alcohol; thickeners or water retention aids such as starch, carboxymethyl cellulose, sodium alginate and carboxy-modified acrylic acid ester-based synthetic thickeners; and pigment dispersants such as sodium polyacrylate, sodium tripolyphosphate and sodium pyrophosphate. Other conventional additives may also be incorporated in the composition of the present invention, and they include preservatives, defoamers, coloring agents such as dyes and pigments, and any other agents for imparting special properties such as waterproofing agents and water repellants.

The paper coating composition of the present invention which contains as the essential components the pigment (A) and the copolymer emulsion (B) which is comprised of the α-olefin, the vinyl ester, the unsaturated carboxylic acid ester, and the unsaturated carboxylic acid may be applied to a paper substrate by any conventional means such as a blade coater, an air knife coater or a roll coater, dried by conventional methods, and if desired, supercalendered, whereby the intended coated paper suitable for gravure printing is obtained.

The following examples are provided in order to further illustrate the present invention. In the examples, all parts and percents are by weight on a solids basis.

EXAMPLE 1

An autoclave equipped with a temperature control unit and a stirrer was charged with an aqueous solution consisting of ion-exchanged water (130 parts), polyoxyethylene nonylphenol ether (4 parts), sodium lauryl sulfate (1 part), hydroxyethyl cellulose (1 part), acetic acid (0.05 part), sodium acetate (0.2 part) and Rongalite (0.5 part). The autoclave was purged with nitrogen and ethylene gases under stirring.

As the temperature in the system was held at 50° C., the autoclave was charged with 34 parts of vinyl acetate and an ethylene gas until the pressure in the system reached 70 kg/cm$^2$. Thereafter, 15 parts of 12% aqueous ammonium persulfate and a monomer mixture consisting of 57 parts of vinyl acetate, 6 parts of 2-ethylhexyl acrylate and 3 parts of acrylic acid were added over a period of 5 hours, throughout which the reaction temperature was held at 50° C., and an additional ethylene gas was fed to maintain the polymerization pressure at 70 kg/cm$^2$. After completion of the polymerization, aging was conducted at 50° C. for 1 hour.

The resulting emulsion had a solids content of 50% and was composed of 30% of ethylene, 64% of vinyl acetate, 4% of 2-ethylhexyl acrylate, and 2% of acrylic acid.

Using this copolymer emulsion, a paper coating composition was prepared by the following procedures.

Ninety parts of kaolin clay, 10 parts of heavy calcium carbonate, 0.4 part of a sodium polyacrylate-based dispersant and 0.2 part of sodium hydroxide were dispersed in a suitable amount of water to make a pigment slurry. To this slurry, 7 parts of the previously obtained copolymer emulsion and 0.3 part of Primal ASE-60 (a trade name of Japan Acrylic Chemical Co., Ltd. for an acrylic thickener) were added and stirred well to make an intimate mixture. The pH of the mixture was adjusted to 9.5 with an aqueous sodium hydroxide solution, and by addition of a suitable amount of water, a paper coating composition with a solids content of 63% was obtained.

This composition was applied to one side of a medium quality paper (basis weight, 70 g/m² in accordance with TAPPI T-410) with an experimental blade coater to provide a coating having a solids content of 8 g/m² on a dry basis. The coating was dried with hot air at 120° C. for 30 seconds. The coated paper was passed twice through supercalendering rolls at 60° C. and at a linear pressure of 60 kg/cm, whereby a product falling within the scope of the present invention was obtained.

The resulting coated paper was held for 24 hours at 20° C. and at 65% RH (relative humidity) in preparation for the following tests.

(1) Adaptability to gravure printing:

The paper was printed with a xylene solvent-based gravure ink in accordance with the "Method of Testing Paper for Its Adaptability to Gravure Printing" described in J. Tappi No. 24 (by the Printing Bureau, Ministry of Finance, Japan). The fidelity of dot reproduction on the paper was visually evaluated by the following criteria: 5, excellent to 1, poor.

(2) Gloss:

The paper was printed with a xylene-solvent based gravure ink in accordance with the "Method of Testing Paper for Its Adaptability to Gravure Printing" described in J. Tappi No. 24 (by the Printing Bureau, Ministry of Finance, Japan). The gloss of the solid printed areas was evaluated by the "Testing Method for Specular Gloss of Paper and Paperboard" described in JIS P 8142.

(3) Dry picking resistance:

The paper was overprinted with a tack-graded ink (#15) on an RI printing machine (Akira Seisakusho Co., Ltd.) and the resistance of the paper to picking was visually evaluated by the following criteria: 5, excellent to 1, poor.

(4) Time-dependent change under accelerated conditions:

The sample was subjected to the test (1) as above after exposure to light in a fadeometer for 5 hours.

(5) Fouling of supercalendering rolls:

The fouling of the surfaces of the rolls through which the coated paper was passed twice for supercalendering was visually evaluated by the following criteria: 5, excellent to 1, poor.

The results of the tests (1) to (5) are summarized in Table 1 below.

EXAMPLES 2 TO 5

Four different samples of copolymer emulsions were prepared as in Example 1 except that the types or amounts of the monomer components were varied as shown in Table 1. Using these samples, paper coating compositions were prepared as in Example 1, and they were applied to base paper to produce coated papers which were then subjected to the tests (1) to (5) as in Example 1. The test results are summarized in Table 1.

COMPARATIVE EXAMPLES 1 TO 6

Paper coating compositions were prepared as in Example 1 except that the copolymer emulsions were replaced by those which were outside the scope of the present invention (Comparative Examples 1 to 4) and commercial products of a styrene-butadiene latex (Comparative Example 5) and an acrylic acid ester-based emulsion (Comparative Example 6), both of which are customarily used in coated paper for gravure printing. These compositions were applied to base paper to make comparative coated paper samples which were then subjected to the tests (1) to (5) as in Example 1. The formulations of the emulsions used and the results of the tests conducted are shown in Table 1.

TABLE 1

| Example & Comparative Example No. | Emulsion Formulation | | | | Adaptability to Gravure Printing | | Gloss (%) | Dry Picking Resistance | Fouling of Super-Calendering Rolls |
|---|---|---|---|---|---|---|---|---|---|
| | α-Olefin | Vinyl Ester | Unsaturated Carboxylic Acid Ester | Unsaturated Carboxylic Acid | As Coated | After Exposure in Fadeometer | | | |
| Example 1 | E 30% | VA 65% | EHA 4% | AA 1% | 5.0 | 4.8 | 83.1 | 4.8 | 4.8 |
| Example 2 | E 10% | VA 75% | EHA 10% | AA 5% | 5.0 | 4.8 | 83.9 | 5.0 | 5.0 |
| Example 3 | E 10% | VA 67% | MA 20% | AA 3% | 5.0 | 4.8 | 83.4 | 5.0 | 5.0 |
| Example 4 | E 25% | VA 67% | EHA 5% | MAA 3% | 5.0 | 4.8 | 83.6 | 5.0 | 4.8 |
| Example 5 | E 15% | VA 73% | EHA 10% | AA 2% | 5.0 | 4.8 | 83.5 | 5.0 | 4.8 |
| Comparative Example 1 | E 5% | VA 90% | EHA 5% | — | 3.0 | 2.8 | 83.6 | 3.8 | 3.5 |
| Comparative Example 2 | E 25% | VA 22% | EHA 50% | AA 3% | 3.8 | 3.5 | 81.4 | 2.3 | 2.0 |
| Comparative Example 3 | — | VA 85% | EHA 10% | AA 5% | 3.0 | 2.8 | 83.2 | 4.0 | 4.0 |
| Comparative Example 4 | E 3% | VA 95% | — | AA 2% | 2.5 | 2.3 | 83.5 | 4.3 | 4.0 |
| Comparative Example 5 | Styrene-butadiene latex (commercial product A) | | | | 3.8 | 1.0 | 83.3 | 4.5 | 4.5 |
| Comparative Example 6 | Acrylic acid ester-based emulsion (commercial product B) | | | | 4.0 | 3.5 | 83.5 | 1.5 | 1.5 |

Abbreviations:
E, ethylene; VA, vinyl acetate; EHA, 2-ethylhexyl acrylate; MA, methyl acrylate; AA, acrylic acid; MAA, methacrylic acid While the invention has been described in detail and with reference to specific embodiments thereof, it will be apparent to one skilled in the art that various changes and modifications can be made therein without departing from the spirit and scope thereof.

What is claimed is:

1. A paper coating composition comprising:
  (A) a pigment, and
  (B) a copolymer emulsion prepared by polymerizing a monomer mixture containing:
    (i) 5 to 40 wt% of an α-olefin of the formula:

$$CH_2=CH-R_1$$

wherein $R_1$ is a hydrogen atom or an alkyl group having 1 to 12 carbon atoms;
    (ii) 30 to 90 wt% of a vinyl ester of the formula:

$$CH_2=CH-OCO-\overset{\overset{R_2}{|}}{\underset{\underset{R_4}{|}}{C}}-R_3$$

wherein $R_2$, $R_3$ and $R_4$ are each a hydrogen atom or an alkyl group having 1 to 18 carbon atoms;

(iii) 1 to 30 wt% of at least one unsaturated carboxylic acid ester selected from the group consisting of an acrylic acid ester in which the alkyl moiety thereof has 1 to 18 carbon atoms and a methacrylic acid or dibasic unsaturated carboxylic acid ester in which the alkyl moiety thereof has 1 to 18 carbon atoms; and (iv) 0.1 to 10 wt% of an unsaturated carboxylic acid.

2. A paper coating composition according to claim 1, wherein said α-olefin (i) is ethylene.

3. A paper coating composition according to claim 1, wherein said vinyl ester (ii) is vinyl acetate.

4. A paper coating composition according to claim 1, wherein said unsaturated carboxylic acid ester (iii) is an unsaturated carboxylic acid ester in which the alkyl moiety thereof has 5 to 14 carbon atoms or a mixture thereof.

5. A paper coating composition according to claim 1, wherein said unsaturated carboxylic acid (iv) is acrylic acid or methacrylic acid.

6. A paper coating composition according to claim 1, wherein the proportions of the monomer components (i) through (iv) are 10 to 30 wt% for (i), 50 to 80 wt% for (ii), 2 to 20 wt% for (iii) and 0.5 to 5 wt% for (iv).

7. A paper coating composition for gravure printing comprising:
(A) a pigment, and
(B) a copolymer emulsion prepared by polymerizing a monomer mixture containing:
(i) 5 to 40 wt% of an α-olefin of the formula:

$$CH_2=CH-R_1$$

wherein $R_1$ is a hydrogen atom or an alkyl group having 1 to 12 carbon atoms;

(ii) 30 to 90 wt% of a vinyl ester of the formula:

$$CH_2=CH-OCO-\overset{\overset{R_2}{|}}{\underset{\underset{R_4}{|}}{C}}-R_3$$

wherein $R_2$, $R_3$ and $R_4$ are each a hydrogen atom or an alkyl group having 1 to 18 carbon atoms;

(iii) 1 to 30 wt% of at least one unsaturated carboxylic acid ester selected from the group consisting of an acrylic acid ester in which the alkyl moiety thereof has 1 to 18 carbon atoms and a methacrylic acid or dibasic unsaturated carboxylic acid ester in which the alkyl moiety thereof has 1 to 18 carbon atoms; and (iv) 0.1 to 10 wt% of an unsaturated carboxylic acid.

8. A process for preparing coated paper comprising applying to a paper substrate a paper coating composition comprising:
(A) a pigment,
(B) a copolymer emulsion prepared by polymerizing a monomer mixture containing:
(i) 5 to 40 wt% of an α-olefin of the formula:

$$CH_2=CH-R_1$$

wherein $R_1$ is a hydrogen atom or an alkyl group having 1 to 12 carbon atoms;

(ii) 30 to 90 wt% of a vinyl ester of the formula:

$$CH_2=CH-OCO-\overset{\overset{R_2}{|}}{\underset{\underset{R_4}{|}}{C}}-R_3$$

wherein $R_2$, $R_3$ and $R_4$ are each a hydrogen atom or an alkyl group having 1 to 18 carbon atoms;

(iii) 1 to 30 wt% of at least one unsaturated carboxylic acid ester selected from the group consisting of an acrylic acid ester in which the alkyl moiety thereof has 1 to 18 carbon atoms and a methacrylic acid or dibasic unsaturated carboxylic acid ester in which the alkyl moiety thereof has 1 to 18 carbon atoms; and (iv) 0.1 to 10 wt% of an unsaturated carboxylic acid, and then drying the applied paper substrate.

9. A paper for gravure printing produced by the process of claim 8.

10. A paper coating composition according to claim 1 comprising an aqueous dispersion medium.

11. A paper coating composition according to claim 10 wherein said aqueous dispersion medium is water.

12. A process according to claim 8 wherein said paper coating composition is applied to the paper substrate in an aqueous dispersion medium.

13. A process according to claim 12 wherein the aqueous dispersion medium is water.

* * * * *